Nov. 25, 1952    R. O. HUTCHENS    2,618,919
LAWN TRIMMING AND EDGING APPARATUS
Filed March 14, 1949    2 SHEETS—SHEET 1

INVENTOR.
Ralph O. Hutchens
BY Bush & Bush
His Attorneys.

Nov. 25, 1952 R. O. HUTCHENS 2,618,919
LAWN TRIMMING AND EDGING APPARATUS
Filed March 14, 1949 2 SHEETS—SHEET 2

Ralph O. Hutchens,
INVENTOR.

BY Bush Bush
His Attorneys.

Patented Nov. 25, 1952

2,618,919

UNITED STATES PATENT OFFICE 2,618,919

LAWN TRIMMING AND EDGING APPARATUS

Ralph O. Hutchens, Compton, Calif.

Application March 14, 1949, Serial No. 81,395

16 Claims. (Cl. 56—25.4)

1

My invention relates to lawn trimming and edging apparatus. The objects of my invention are to provide an improved form of cutter for trimming lawns and for cutting the edges thereof; to provide apparatus which can be used for said purposes separately and wherein the trimming blade and the edger blade are separately adjustable; to provide an adjustable guard to prevent injury to trees and other objects, and to provide improved supporting and guiding means for such apparatus whereby it may be guided and handled with ease and facility.

Another purpose of my apparatus is to combine in a single convenient machine a co-acting trimmer and a co-acting edger in such form that they can be used simultaneously or separately as desired; to make them angularly adjustable laterally so that they can be used simultaneously not only for edging and trimming the grass at the edge of a walk, but also so that they can be inclined away from each other to simultaneously trim the lower part of a terrace and part of the lawn adjoining the terrace and can be utilized to cut the grass simultaneously on both sides of any ordinary sized grassed-over ditch or hollow with angular sides in or between lawns or parks.

I accomplish these objects by the means illustrated in the accompanying drawings, in which, Figure 1 is a side elevation of my apparatus but showing only a portion of the engine and handle;

Figure 2:
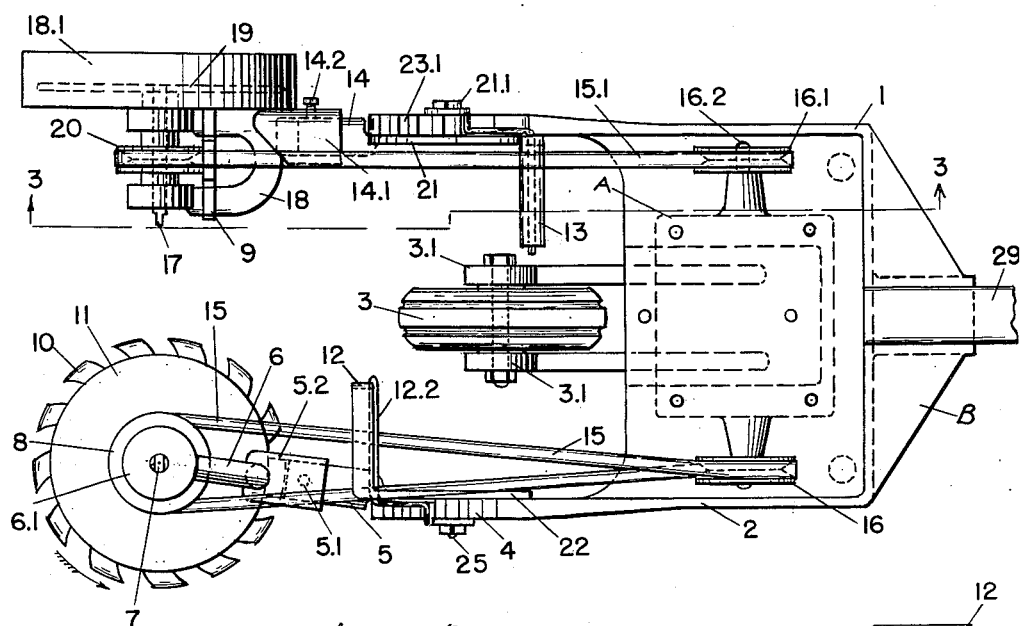
Figure 2 is a top or plan view of my machine but showing the engine in dotted lines only.
Figure 4:
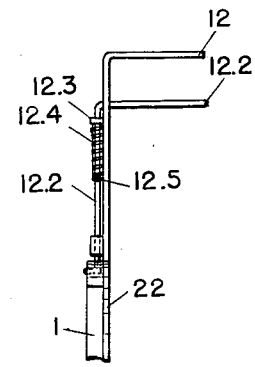
Figure 4 is a detail of one of the adjusting levers for raising or lowering the cutter or trimmer blade and its supporting arm.

My invention includes a frame B preferably of metal comprising a base with side members 1 and 2 and with a socket inclined upwardly at the rear to receive a handle 29 by which the machine may be steered or pushed around as desired.

A ground wheel 3 is journaled in forwardly extending arms 3.1 united to the base of the frame. This ground wheel may be provided with a rubber tire and may be of any desired material of sufficient strength and size to support the weight of the entire machine.

Upon the base an engine A shown only in dotted lines, is mounted preferably of the small internal combustion type, but any desired form of prime mover may be used thereon.

The side members 1 and 2 of the frame extend forwardly of the base and have racks 4 and 23.1 united to or formed integral therewith at their forward ends.

A plate 22 preferably circular, is mounted upon the shaft 25 journaled in the front end of the left side member 2. A supporting arm 5 is rigidly united to the plate 22 and extends forwardly therefrom with a sleeve 5.2 mounted thereon. The front end of the sleeve is formed into a fork or yoke 6 in which a shaft 7 is revolvably mounted. Upon the shaft 7 a belt pulley 8 is mounted carrying a belt 15 which extends rearwardly to and around a drive pulley 16 mounted upon the engine shaft. A set screw 5.1 in the sleeve 5.2 secures it in adjusted position upon the arm 5.

Below the pulley 8 a circular trimmer blade 10 is mounted upon the lower end of the shaft 7 and the shaft carries a disc-shaped guard 11 mounted thereon above the trimmer blade which is arranged to revolve in a plane parallel to the surface of the ground to be mowed or trimmed.

In order to raise the blade 10 above the ground, an adjusting lever 12 is rigidly united to the plate 22 and has a latch bar 12.2 slidably mounted thereon with its lower end arranged to engage the notches in the rack 4.

The lever 12 extends upwardly from the plate 22 and the upper end of it is bent at a right angle to form a handle. The upper end of the latch bar 12.2 is likewise bent at a right angle and is extended through a slot 12.1 in the body of the lever 12 so that the handle of the lever 12 and the corresponding portion of the latch bar may be grasped by the hand of the operator and the latch bar drawn upwardly to release it from the notches of the rack 4 whereby the cutter 10 may be raised or lowered and locked in adjusted position.

A lug 12.3 may be united to the lever 12 with a bore through which the latch bar 12.2 may pass. A cotter pin 12.5 may be inserted in the latch bar 12.2 and a compression spring 12.4 mounted upon the latch bar with one end abutting against the lug 12.3 and the other end abutting against the cotter pin 12.5, in order to hold the lower end of the latch bar 12.2 in one of the notches of the rack 4 when not manually withdrawn.

A similar plate 21 may be pivoted upon a shaft 21.1 journaled in the forward end of the side member 1, with a supporting arm 14 united to the plate 21 extending forwardly therefrom carrying a sleeve 14.1 with a yoke 18 formed at its front end which carries a shaft 17 mounted therein. Upon the shaft 17 a circular cutter 19 is mounted to revolve with the shaft and may be covered by a guard 18.1 carried by the yoke 18. The yoke may be adjusted longitudinally or angularly with the sleeve 14.1 and secured in adjusted position by the set screw 14.2. It will be observed that the yoke 18 supports the blade 19 upon its supporting bar 14, and the yoke 6 holds the blade 10 upon its supporting bar 5; that the yokes are adjustable by loosening the set screws which hold them and then turning them manually upon their supports in any angular position desired. They may diverge at an angle of 90° from each other or if used at the junction of a lawn and a terrace having a common angle of as much as 135°, they may be adjusted to correspond.

Likewise, if used to mow a grassed-over ditch with sides at greater or lesser angle, one or both blades may be adjusted to correspond. Also, if mowing a terrace, the inclined mower plate may be carried along the foot of the terrace or it may be raised and operated higher than the lawn level by using a shorter belt while the horizontal plate is still acting on the adjacent lawn.

Figure 1:
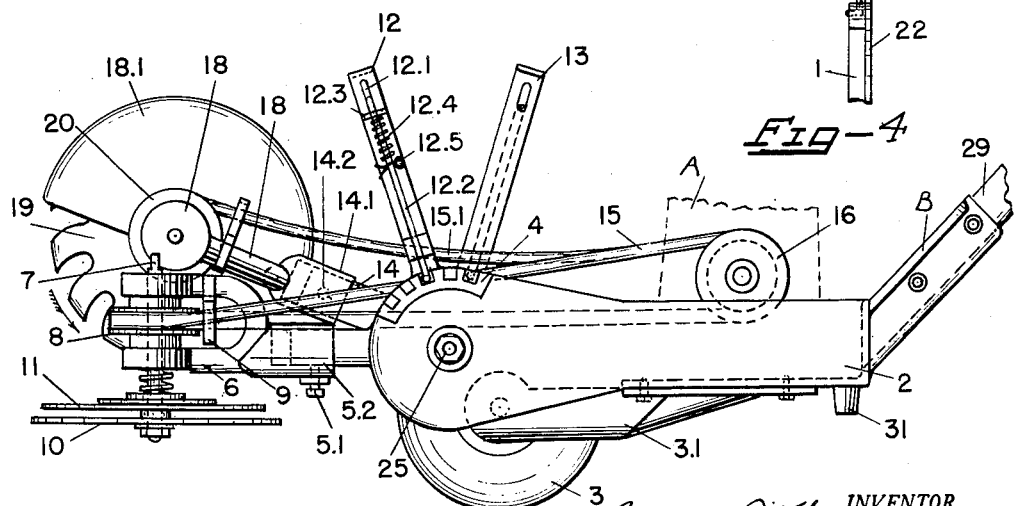
Figure 3:
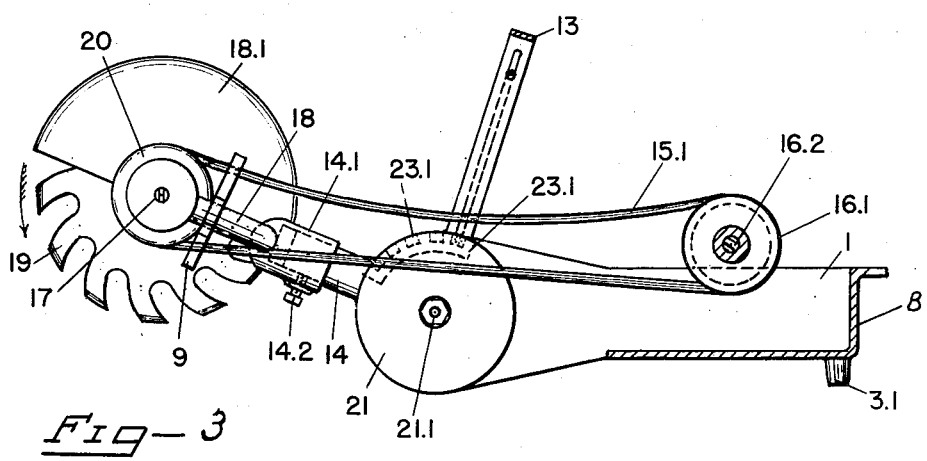
Figure 3 is a sectional detail on the line 3—3 of Figure 2.
Figure 5:
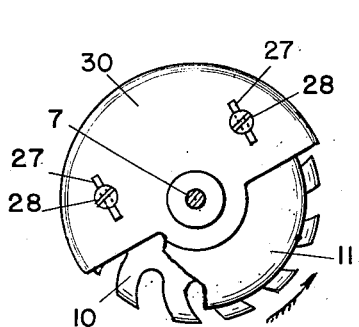
Figure 5 shows a plan view of an alternate form in which an additional guard 30 is mounted upon the trimmer guard 11.
Figure 6:
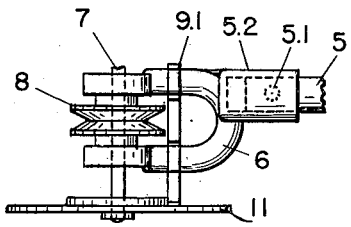
Figure 6 shows an alternate form in which the belt guard 9.1 supports the guard plate 11 and holds it stationary.

The shaft 17 also carries a belt pulley 20 over which a belt 15.1 travels which belt is driven by a corresponding pulley 16.1 mounted upon an extension of the engine shaft 16.2. Guide bars 9 and 9.1 may be united to the forks 18 and 6 to act as guides for the belts 15.1 and 15 and to retain them against displacement. In Figure 1 I have shown a coiled spring surrounding the shaft 7 which may be numbered 32, one end of which bears against the fork 6 and the other end against a washer 33 which in turn bears against a circular plate 34 which contacts the guard-plate 11. Short legs 31 may be united to the front end of the frame B.

An adjusting lever 13 is united to the plate 21 and provided with latching means corresponding to that mounted upon the lever 12 as described above.

In the operation of my apparatus, when it is desired to trim the edges of the lawn along a sidewalk or a flower bed or any other thing, the right hand arm may be lowered and put in adjusted position so that as the machine is held in the desired position by the handle, the teeth of the vertical edger blade 19 will extend to the desired distance relative to the surface of the turf or ground or walk.

The engine can then be started and the machine pushed along the walk or flower bed so the edger will trim the grass along the edge thereof on the desired line. In the meantime, the trimmer blade will be raised by its adjusting lever 12 and held in an upraised position. At the same time the trimmer belt will be slackened by the raised position of the trimmer or it may be removed from one or both of the belt pulleys as desired.

When desired to utilize the horizontal trimmer blade, the vertical edger blade may be raised into an inoperative position which will loosen its belt and the trimmer blade may be lowered to the desired point relative to the ground level.

When desired to trim grass around trees or close to a wall or other structure, an adjustable guard plate 30 may be mounted upon the trimmer guard 11 by set screws 28 extending through slots 27 formed in the additional guard plate 30, and may be set so as to project beyond the line of travel of the teeth so as to guard against the teeth striking the bark of a tree or the side of a wall or other structure. Another advantage of my machine is that if desired, both cutting plates can be adjusted to the horizontal and at the same level, thus allowing a swath of double width to be cut at one time. In many cases it will be desired to use both cutting plates at the same time either at different angles or with both of them in the horizontal so as to cut a double swath and my machine is so designed that they can be used either simultaneously or separately as desired.

Various modifications may be made in the shape, design and proportions of the different parts and if desired the teeth may be sharpened, but I do not limit my claims to the precise forms shown in the drawings.

I claim:

1. A dual grass-trimming and edging machine including a base having a supporting ground wheel journaled thereon spaced side members united to the base, supporting arms having their rear ends mounted upon the side members and projecting forwardly therefrom, sleeves mounted upon the front ends of said supporting arms and adjustable to various rotational positions thereon, each sleeve having a yoke or fork formed integral therewith, and shafts journaled in said yokes respectively each carrying a belt pulley between the arms of its yoke and a circular trimming or cutting blade mounted upon a projecting end of said shaft.

2. A dual grass-trimming and edging machine as described in claim 1, and a prime mover having belts arranged to drive said belt pulleys either simultaneously or separately.

3. A dual grass-trimming and edging machine including a base having a supporting ground wheel journaled thereon, spaced side members united to the base, supporting arms having their rear ends pivotally mounted upon the side members and projecting forwardly therefrom, a rack formed upon each side member and a latch carried by each supporting arm arranged to engage its adjacent rack and lock the arms respectively in various angles of elevation, sleeves mounted upon the front ends of said supporting arms, each sleeve having a yoke or fork formed integral therewith, a shaft with one projecting end journaled in said yokes respectively each shaft carrying a belt pulley between the arms of its yoke and a circular trimming or cutting blade mounted upon its projecting end, and a prime mover having belts arranged to drive said belt pulleys.

4. A dual grass-trimming and edging machine as described in claim 1, and means mounted on the base to drive the belt pulleys.

5. In a dual grass-trimming machine, a base having a supporting ground wheel journaled thereon, spaced side members united to the base, supporting arms having their rear ends mounted upon the side members and projecting forwardly therefrom, sleeves mounted upon the front ends of said supporting arms, each sleeve having a fork formed integral therewith, shafts journaled in said forks respectively carrying belt pulleys between the arms of the fork and a circular trimming or cutting blade mounted upon a projecting end of each of said shafts respectively, the sleeves being secured to the supporting arms by set screws and arranged to hold the forks and blades at various lateral angles of adjustment relative to the ground and to each other.

6. A grass-trimming machine as described in claim 5, said supporting arms being pivoted upon the side members, and racks carried by the side members respectively arranged to be locked by latches carried by the supporting arms to secure the arms in various angles of elevation relative to the base.

7. A grass-trimming machine including a base having a supporting ground wheel journaled thereon, supports having their rear ends pivotally united to the base and projecting forwardly therefrom, a rack united to the base at the rear of each support, latching means carried by the supports to engage the racks and arranged to secure the supports in various angular positions relative to the base, forks united to the supports, shafts each with a projecting end journaled in said forks respectively carrying belt pulleys between the arms of the fork, a circular cutting blade mounted upon the projecting end of each of said shafts respectively, and means to drive the belt pulleys.

8. A grass-trimming machine including a base having a supporting ground wheel journaled thereon, supports having their rear ends pivotally united to the base and projecting forwardly therefrom, a rack united to the base at the rear of each support, latching means carried by the supports to engage the racks and arranged to secure the supports in various angular positions relative to the base, forks united to the supports, shafts journaled in said forks respectively carrying belt pulleys between the arms of the fork, a cutting blade mounted upon a projecting end of each of said shafts respectively, and means to drive the belt pulleys.

9. In a dual-bladed grass-trimming and edging machine, the combination with a base including side members, of a supporting ground wheel journaled thereto, a pair of spaced carrying arms adjustably mounted upon the base, a sleeve adjustably mounted upon each arm, means to secure each sleeve separately in various positions of rotation, means united to each sleeve to carry a shaft journaled therein, and a cutting blade mounted on each shaft, the blades being arranged for angular adjustment with the adjustment of the sleeves respectively.

10. The combination as set out in claim 9, and means to revolve the shafts and blades either separately or simultaneously.

11. In a dual-bladed grass-trimming and edging machine, the combination with a base including side members, of a wheeled support journaled thereto, supports having their rear ends pivotally united to the base and projecting forwardly therefrom, a rack united to the base at the rear of each support, latching means carried by the supports to engage the racks and arranged to secure the supports in various angular positions relative to the base, forks united to the supports, shafts journaled in said forks respectively carrying belt pulleys between the arms of the fork, a circular cutting blade mounted upon a projecting end of each of said shafts respectively, and means to drive the belt pulleys.

12. In a dual-bladed grass-trimming and edging machine, the combination with a base including side members, of a wheeled support journaled thereto, spaced side members united to the base, supporting arms having their rear ends mounted upon the side members and projecting forwardly therefrom, sleeves mounted upon the front ends of said supporting arms each sleeve having a fork formed integral therewith, shafts journaled in said forks respectively carrying belt pulleys between the arms of the fork and a circular trimming or cutting blade mounted upon a projecting end of each of said shafts respectively, the sleeves being secured to the supporting arms by set screws and arranged to hold the forks and blades at various angles of adjustment relative to the ground and to each other.

13. The combination as described in claim 12, said supporting arms being pivoted upon the side members and racks carried by the side members respectively, arranged to be locked by latches carried by the supporting arms to secure the arms in various angles of elevation relative to the base.

14. In a dual-bladed grass-trimming and edging machine, the combination with a base including side members, of a wheeled support journaled thereto, a pair of blade-supporting arms united to and extending forwardly from the frame, a cutting blade journaled in the front end of each arm, means to raise or lower the front ends of the arms respectively, and means whereby the front portion of each arm and the blade carried thereby may be adjusted at various angles laterally from the horizontal.

15. In a grass-trimming and edging machine, a frame including side members, a wheeled support journaled to the frame, a cutting-blade supporting arm pivotally united to and extending forwardly from the frame, a sleeve adjustably mounted upon the front end of the arm with a set screw mounted in the sleeve to secure it in adjusted position upon the supporting arm, a yoke united to the sleeve, a shaft revolvably mounted in the yoke and arranged to carry a cutting blade, and means to drive the shaft.

16. In a grass-trimming and edging machine, a frame including side members, a wheeled support journaled to the frame, a cutting-blade supporting arm pivotally united to and extending forwardly from the frame, an adjusting lever united to the arm and with a rack mounted on the frame arranged to hold the lever in various positions, a sleeve adjustably mounted upon the front end of the arm with a set screw mounted in the sleeve to secure it in adjusted position upon the supporting arm, a yoke united to the sleeve, a shaft revolvably mounted in the yoke and arranged to carry and operate a cutting blade, and means to drive the shaft.

RALPH O. HUTCHENS.

REFERENCES CITED

The following references are of record in the file of this patent:

UNITED STATES PATENTS

| Number | Name | Date |
|---|---|---|
| 322,193 | McLaughlin | July 14, 1885 |
| 1,447,606 | Seymour | Mar. 6, 1923 |
| 1,891,526 | Dupuis | Dec. 20, 1932 |
| 1,991,305 | Willits | Feb. 12, 1935 |
| 2,185,659 | Chernow | Jan. 2, 1940 |
| 2,263,368 | Sejkora | Nov. 18, 1941 |
| 2,478,813 | Esleck | Aug. 9, 1949 |
| 2,480,922 | Harshman | Sept. 6, 1949 |
| 2,483,683 | Wells et al. | Oct. 4, 1949 |

FOREIGN PATENTS

| Number | Country | Date |
|---|---|---|
| 107,917 | Australia | July 6, 1939 |